United States Patent
Saltzman et al.

(10) Patent No.: US 9,003,235 B2
(45) Date of Patent: *Apr. 7, 2015

(54) INDICATING COVERAGE OF WEB APPLICATION TESTING

(71) Applicant: International Business Machines Corporation, Armonk, NY (US)

(72) Inventors: Roi Saltzman, Rishon Le Zion (IL); Ori Segal, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/024,739

(22) Filed: Sep. 12, 2013

(65) Prior Publication Data

US 2014/0129620 A1 May 8, 2014

Related U.S. Application Data

(63) Continuation of application No. 13/671,972, filed on Nov. 8, 2012.

(51) Int. Cl.
*G06F 11/00* (2006.01)
*G06F 11/36* (2006.01)
*H04L 29/08* (2006.01)
*H04L 12/26* (2006.01)

(52) U.S. Cl.
CPC ........ *G06F 11/3668* (2013.01); *H04L 67/2804* (2013.01); *H04L 67/2819* (2013.01); *H04L 67/02* (2013.01); *H04L 43/50* (2013.01); *G06F 11/3676* (2013.01)

(58) Field of Classification Search
USPC ........................ 714/38.1, 38.14, 32
See application file for complete search history.

(56) References Cited

U.S. PATENT DOCUMENTS

| | | | |
|---|---|---|---|
| 6,212,675 B1 | 4/2001 | Johnston et al. | |
| 6,865,735 B1 * | 3/2005 | Sirer et al. | 717/158 |
| 2003/0191987 A1 * | 10/2003 | Brown | 714/38 |
| 2008/0235633 A1 | 9/2008 | Ghiloni et al. | |
| 2010/0325615 A1 * | 12/2010 | Ramot | 717/124 |
| 2011/0107153 A1 | 5/2011 | Ilan et al. | |
| 2012/0023487 A1 * | 1/2012 | Letca et al. | 717/130 |

* cited by examiner

*Primary Examiner* — Yolanda L Wilson
(74) *Attorney, Agent, or Firm* — Cuenot, Forsythe & Kim, LLC

(57) ABSTRACT

Testing a system under test includes intercepting, within a proxy system, a request from a client system sent to the system under test. The request is analyzed within the proxy system and sent to the system under test. Within the proxy system, a response from the system under test sent to the client system is intercepted. The response is instrumented creating a modified response indicating test coverage according to the request. The modified response is sent to the client system.

10 Claims, 3 Drawing Sheets

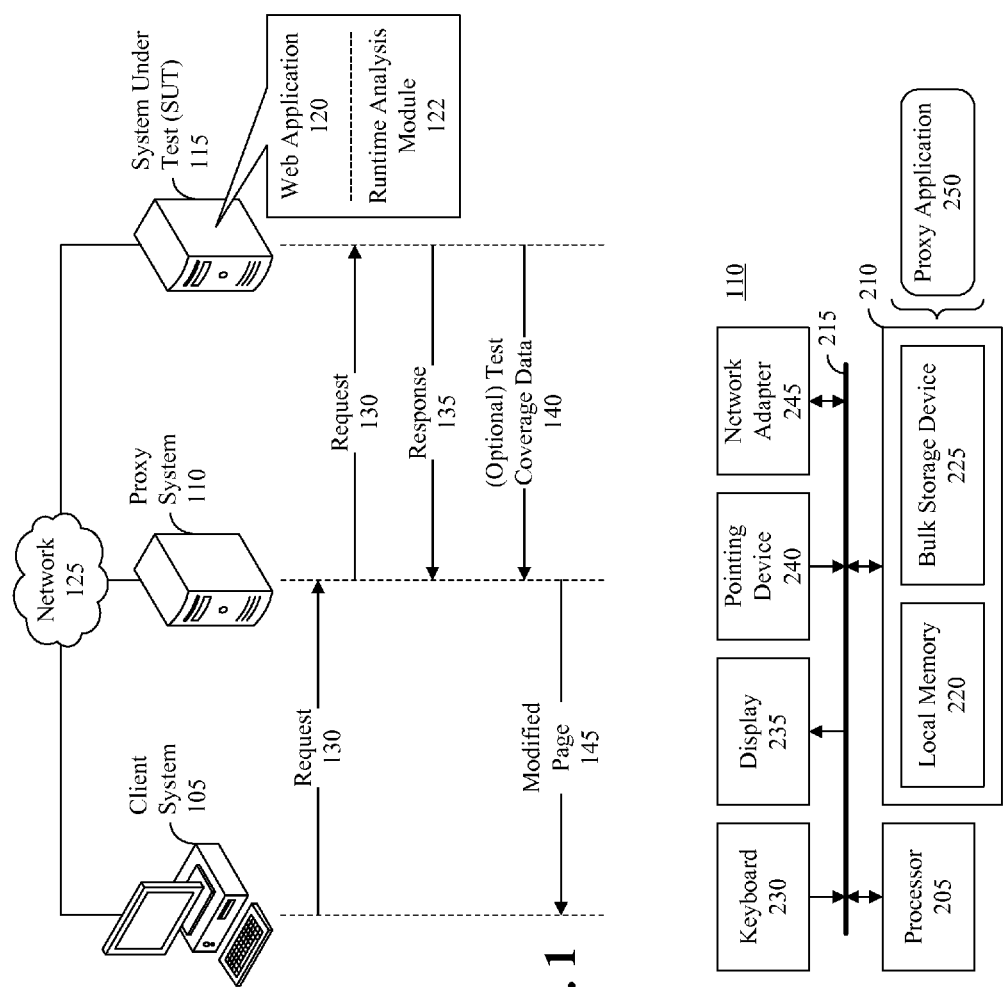

INDICATING COVERAGE OF WEB APPLICATION TESTING

CROSS-REFERENCE TO RELATED APPLICATIONS

This application is a Continuation of U.S. application Ser. No. 13/671,972, filed on Nov. 8, 2012, the entirety of which is incorporated herein by reference.

BACKGROUND

Testing a Web application often involves the use of an automated Web crawler. The Web crawler is configured to fill in forms, submit the forms, click (e.g., select) links in the Web application and the like. A large number of modern Web applications, however, have taken on a look and feel that closely parallels that of traditional desktop applications.

One consequence of Web applications emulating aspects of desktop applications is that automated testing methodologies are of limited benefit. Web crawlers and other forms of automated testing using scripts, for example, are unable to test a Web application with the same attention to detail as a human tester. Unlike automated testing methodologies, a human tester is able to manually navigate the Web application and determine an order of navigation and testing that follows the logic of the Web application when performing functional and/or security related testing.

BRIEF SUMMARY

A method includes intercepting, within a proxy system, a request from a client system sent to a system under test (SUT). The request is analyzed within the proxy system and sent to the SUT. Within the proxy system, a response from the SUT that is sent to the client system is intercepted. The method includes instrumenting the response, using a processor of the proxy system, thereby creating a modified response indicating test coverage according to the request. The modified response is sent to the client system.

A system includes a processor programmed to initiate executable operations. The executable operations include intercepting, within a proxy system, a request from a client system sent to an SUT, analyzing the request within the proxy system, and sending the request to the SUT. The operations further include intercepting, within the proxy system, a response sent from the SUT to the client system, instrumenting the response within the proxy system creating a modified response indicating test coverage according to the request, and sending the modified response to the client system.

A computer program product for testing an SUT includes a computer readable storage medium having program code embodied therewith. The program code is executable by a processor to perform a method. The method includes intercepting, within a proxy system using the processor, a request from a client system sent to an SUT, analyzing the request within the proxy system and sending the request to the SUT using the processor. The method further includes intercepting, within the proxy system using the processor, a response sent from the SUT to the client system, instrumenting the response, using the processor, creating a modified response indicating test coverage according to the request, and sending the modified response to the client system using the processor.

BRIEF DESCRIPTION OF THE SEVERAL VIEWS OF THE DRAWINGS

FIG. 1 is a block diagram illustrating an example of a computing environment.

FIG. 2 is a block diagram illustrating an example of the proxy system of FIG. 1.

DETAILED DESCRIPTION

Figure 3:
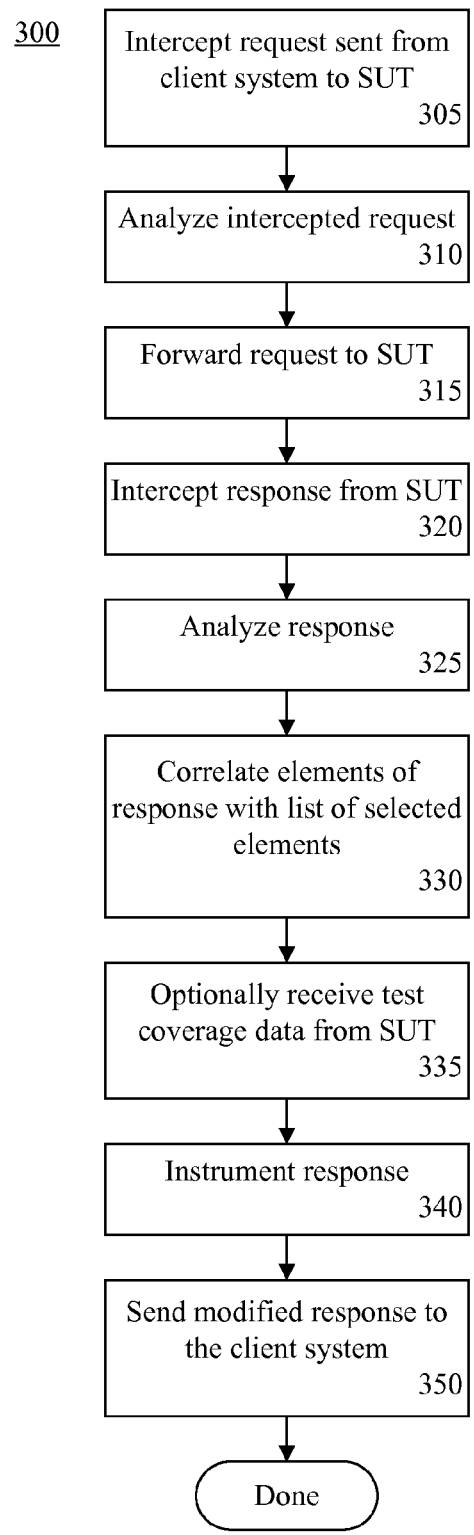
FIG. 3 is a flow chart illustrating an exemplary method of testing a Web application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to indicating the coverage of Web application testing. In accordance with the inventive arrangements disclosed within this specification, a proxy system is inserted between a client system used by a tester, e.g., a human being, and a Web application undergoing testing and executing in a data processing system. The proxy system is configured to monitor and analyze communications exchanged between the client system and the Web application to determine which portions of the Web application have and have not been executed or visited by the client system. The proxy system instruments communications sent from the Web application to the client system to indicate to a tester what has or has not yet been tested.

FIG. 1 is a block diagram illustrating an example of a computing environment 100. Computing environment 100 is configured for testing a Web application and, in particular, Web application 120. As shown, computing environment 100 includes a client system 105, a proxy system 100, and a system under test (SUT) 115 communicatively linked with one another through a network 125. Exemplary implementations of network 125 include a WAN, a LAN, a wireless network, a mobile network, a Virtual Private Network (VPN), the Internet, other known networks and/or various combinations of the listed network types.

SUT 115 is a data processing system such as a server that is configured to execute a Web application 120. Web application 120 is undergoing testing. In this regard, SUT 115 refers to the data processing system in combination with Web application 120. In another aspect, the data processing system is further configured to execute a runtime analysis module 122. In that case, SUT 115 refers to the data processing system in combination with Web application 120 and runtime analysis module 122.

In general, Web application 120 is undergoing testing by a user or tester working at client system 105. In one aspect, Web application 120 is instrumented with program code that performs coverage analysis. For example, the instrumented program code of Web application 120, when executed, can interact with runtime analysis module 122, which generates coverage data indicating which portions of Web application 120 have been executed during the testing session and which have not.

Client system 105 is a data processing system that either executes a browser or includes browser functionality. Through client system 105, a user, in reference to a human being or a "tester," can send requests for content such as pages to SUT 115, receive content such as pages from SUT 115, and render the pages up a display of client system 105. A "page" generally refers to a markup language file or files in addition to any other elements that may be incorporated within or referenced by such page. Exemplary implementations of client system 105 include a desktop computer as pictured, a portable computing device such as a laptop or a tablet, a mobile computing device such as an Internet-enabled mobile phone, or the like.

Proxy system 110 is implemented as a data processing system that intercepts communications sent from client system 105 to SUT 115 and further intercepts communications sent from SUT 115 to client system 105. Proxy system 110 is configured to analyse received communications whether from client system 105 or from SUT 115. For example, proxy system 110 identifies the various components included within the intercepted communications, determines correlations between components in communications received from client system 105, determines correlations between components in communications from SUT 115, and/or determines correlations between components received in communications from client system 105 and components in communications from SUT 115. Based upon the analysis, proxy system 110 modifies communications received from SUT 115 and forwards, or sends, the modified communication on to client system 105.

Within computing environment 100, to effectuate testing, client system 105 is configured to direct requests intended for the SUT to proxy system 110. Similarly, SUT 115 is configured to direct responses, e.g., pages, intended for client system 105 to proxy system 110. With this configuration in place, client system 105 initiates a testing session with SUT 115. As part of the testing session, client system 105 sends a request 130 to SUT 115. Request 130 specifies a particular page of Web application 120 that is to be retrieved. Proxy system 110 intercepts request 130 and performs an analysis upon request 130. Proxy system 110 forwards request 130 to SUT 115.

SUT 115 sends a response 135, e.g., a response to request 130, to client system 105. Proxy system 110 intercepts response 135. Proxy system 135 performs analysis upon response 135. In one aspect, proxy system 110 is in communication with SUT 115 to receive optional test coverage data 140 from SUT 115. Proxy system 110 modifies, e.g., instruments, response 135 thereby generating modified response 145, which is sent to client system 105.

In one aspect, proxy system 110 is configured to determine which portions of Web application 120 have and have not been executed or visited based upon intercepted requests and/or intercepted responses. Proxy system 110 instruments responses from Web application 120 to client system 105 in real time to aid the tester in determining what has or has not yet been tested. As used herein, "instrumenting" an object that includes executable program code (e.g., object code or a binary file), interpretable program code (e.g., a script or markup language), or source code, refers to inserting additional program code into the object, deleting program code from the object, modifying existing program code of an object, or any combination of the aforementioned actions. As used herein, the phrase "real time" means a level of processing responsiveness that a user or system senses as sufficiently immediate for a particular process or determination to be made, or that enables the processor to keep up with some external process.

In one aspect, proxy system 110 modifies an element of response 135 based upon one or more previously received and analysed requests from client system 105. For example, proxy system 110 modifies a visualization parameter of an element in response 135 to visually indicate that the element has already been selected via client system 105. The modified element is visually distinguished from an element that has not been visited or selected.

In another example, proxy system 110 modifies an element of response 135 based upon test coverage data 140 that is received from runtime analysis module 122. For example, one or more additional visual elements can be added to response 135 resulting in modified response 145. In still another example, scripts can be modified, added, or removed with respect to response 135. Further aspects of the analysis performed by proxy system 110 and the instrumentation of response 135 are described within this specification.

FIG. 2 is a block diagram illustrating an example of proxy system 110 of FIG. 1. As noted, proxy system 110 is implemented as a data processing system. Proxy system 110 includes at least one processor (e.g., a central processing unit) 205 coupled to memory elements 210 through a system bus 215 or other suitable circuitry. As such, proxy system 110 can store program code within memory elements 210. Processor 205 executes the program code accessed from memory elements 210 via system bus 215. In one aspect, proxy system 110 is implemented as a computer or other programmable data processing apparatus that is suitable for storing and/or executing program code. It should be appreciated, however, that proxy system 110 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Proxy system 110 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to proxy system 110. The I/O devices can be coupled to proxy system 110 either directly or through intervening I/O controllers. One or more network adapters 245 also can be coupled to proxy system 110 to enable proxy system 110 to become coupled to other systems, computer systems, remote printers, and/or remote storage devices through intervening private or public networks. Modems, cable modems, and Ethernet cards are examples of different types of network adapters 245 that can be used with proxy system 110.

As pictured in FIG. 1, memory elements 210 can store a proxy application 250. Proxy application 250, being implemented in the form of executable program code, is executed by proxy system 110 and, as such, can be considered an integrated part of proxy system 110. Proxy application 250, requests from the client system, responses such as pages and coverage data sent from the SUT are functional data structures that impart functionality when employed as part of a data processing system as described within this specification.

Though FIG. 2 is presented as an exemplary implementation of proxy system 110, it should be appreciated that the architecture described also can be used to implement client system 105 and/or SUT 115 regardless of the particular form factor of the resulting data processing system. Appreciably, client system 105 executes different operational software and/or application software than proxy system 110 as would SUT 115.

FIG. 3 is a flow chart illustrating an exemplary method 300 of testing a Web application. More particularly, FIG. 3 is illustrative of a method of providing indications of test coverage to a user during testing of a Web application. Method 300 is implemented by the proxy system described with reference to FIGS. 1 and 2 of this specification. Method 300 can begin in a state where a testing session has been started involving a computing architecture as described in FIG. 1.

In block 305, the proxy system intercepts a request that is sent from the client system to the SUT. In one example, the request is a Hypertext Transfer Protocol (HTTP) request and can include markup language content. The markup language content can be specified as Hypertext Markup Language (HTML) program code, but is not limited in this regard.

In block 310, the proxy system analyzes the intercepted request. In one aspect, the proxy system is configured to fully parse markup language and, in particular, HTML. As such, the proxy system parses the intercepted request into constituent Document Object Model (DOM) elements such as links, forms, buttons, comments, JavaScripts and/or equivalents thereof (hereafter "scripts"), etc. The proxy system can analyze requests (e.g., HTTP requests) from the client system in real time or in substantially real time. In one aspect, as part of the analysis, the proxy system creates and/or stores a record of the intercepted request from the client system. The record can be a representation of the request, a copy of the request itself, a list of the DOM elements of the request, or the like.

In one example, as part of the analysis, the proxy system determines the particular element that was selected from the client system that initiated the intercepted request. For example, the client system will have a page loaded therein that was retrieved or obtained from the SUT, e.g., a prior response, as part of the testing of the Web application. The proxy system determines the element of the page that was selected to initiate or generate the request that was intercepted in block 305. The request, for example, can include an identifier of the particular element that was selected. The identifier, e.g., a record of the element and/or identifier of the element, can be stored within the proxy system. The proxy system can maintain records indicating elements selected by the client system. For example, the proxy system can maintain a list of selected elements by the client system (i.e., a list of elements of the Web application selected by a tester using the client system).

In block 315, the proxy system forwards the request to the SUT. The request can be forwarded in real time or in substantially real time as the analysis described with reference to block 310 can be performed efficiently and quickly. Responsive to the received request, the SUT provides a response to the request. In block 320, the proxy system intercepts the response from the SUT. As noted, in one aspect, the response is a page from the SUT, e.g., from the Web application undergoing testing.

In block 325, the proxy system analyzes the received response. The proxy system can perform similar analysis upon the response as is performed upon the request received from the client system. For example, the proxy system can parse the intercepted response into constituent DOM elements.

In block 330, the proxy system correlates the response with the list of selected elements. In one aspect, the proxy system compares elements of the response with the list of elements selected by the client system that is maintained in the proxy system. From the comparison, the proxy system can identify any elements of the response that match an element on the list of selected elements and determine that the element in the response was previously selected or visited. In this manner, the proxy system can determine which portions of the Web application have been visited and have not been visited in a self-contained manner by analyzing the requests and responses that are intercepted.

In block 335, the proxy system optionally receives test coverage data from the SUT. More particularly, the proxy system can receive the test coverage data from the runtime analysis module. In one example, the SUT provides test coverage data with the response. In another example, the SUT provides the test coverage data separately from the response. The SUT can provide the test coverage data from time to time, periodically, or the like, e.g., without first being queried for such data by the proxy system. In another example, the proxy system can query the SUT for updated test coverage data. In still another example, the SUT can provide the test coverage data with each response to a received request. In general, the test coverage data is more expansive and detailed than the elemental analysis performed by the proxy system. As such, the proxy system can instrument the response with more detailed test coverage data than is determined by the proxy system alone.

In block 340, the proxy system instruments the response thereby generating a modified response. The proxy system can instrument responses, e.g., HTTP responses, from the SUT in real time or in substantially real time prior to such response being sent to the client system. As part of the instrumentation that is performed, the proxy system can manipulate HTML and/or scripts within the response. In addition, the proxy system can interact with the runtime analysis module as described to receive the test coverage data and instrument the response using such data.

In one aspect, the proxy system instruments the response according to the correlation(s) determined in block 330. In illustration, the proxy system modifies an element of the response that matches an element on the list of selected elements. For example, the proxy system changes a visualization parameter, e.g., a color or other visual aspect of the element thereby visually distinguishing the element from an element that has not been selected. In another aspect, the proxy system can modify the response to disable the element.

In another aspect, the proxy system instruments the response with respect to an element of the response that has been determined to be associated with a script. In some cases, a response includes an element that initiates a client-side action that does not directly submit an HTTP request. The element, for example, calls or invokes a client side script that performs, or causes the client system to perform, an operation. In that case, the proxy system can detect an element, e.g., a button or the like, that is associated with, or bound to, the client side script. In one illustration, the element may be bound to a first client side script through a DHTML (Dynamic HTML) event. For example, responsive to a "click" event of the element, the associated first client side script is executed.

The proxy system instruments the response by modifying the element to include or reference a second client side script that is different form the first client side script. The proxy system, for example, instruments the response so that the second client side script is invoked by a click event for the element instead of the first client side script. The second client side script can perform one or more functions. In addition, the second client side script can execute or invoke the first client side script so that the original functionality of the element associated with the first client side script is maintained within the instrumented response. When executed responsive to an "onclick" event for the element, the second client side script can perform various functions such as notifying the proxy system that the element was selected, visually alter the associated element, disable the associated element from further selections, or the like. The second client side script, as noted, further invokes the first client side script.

In illustration, consider the case in which an "onclick" event of a button in the response is bound to a first JavaScript. The original response includes HTML code such as "<input type="submit" onclick="original_function( )" . . . >". The proxy system instruments the response to be "<input type="submit" onclick="coverage_marker( )" . . . >". The second JavaScript "coverage_marker" is dynamically changed when executed to include a call to "original_function( )" after the second JavaScript visually modifies the button to mark the button as being selected or visited. The button further can be disabled or the like.

The second JavaScript "coverage_marker" effectively marks the HTML for the button as being visited through the modification of the element (change in visual appearance and/or disabling). As such, the button is visually distinguished from other buttons or elements not yet selected during testing. The second JavaScript further notifies the proxy server of the button being selected. For example, the name/id of the button (or other HTML element) that was selected and caused execution of the second JavaScript can be sent to the proxy system and stored therein on the list of selected elements. As such, when a response including the button is provided to the client system in the future, the button again can be visually modified and/or disabled to indicate that the button has already been selected.

In still another illustration, the proxy system modifies the response according to any test coverage data that is received from the SUT. For example, the proxy system can receive test coverage data indicating that some percentage of program code of the Web application that is associated with a particular selectable element has not been executed. In that case, the proxy system can insert an additional visual element next to the visual element indicating the amount of program code associated with the element that has not yet been executed or that has been executed.

For example, the test coverage data can indicate a number of secondary selectable visual elements that have not yet been selected in association with a first or primary visual element. Consider the case in which a selection of a first link within the response causes five additional selectable links to be presented to a user in a subsequent response or page from the SUT. Further, of the five selectable links, three have already been selected and visited during testing as indicated by received test coverage data. In that case, the proxy system can insert a visual element next to the first link indicating that there are two untested and/or unvisited links beneath the first link or two untested of five total links beneath the first link.

In block 350, the proxy sends the instrumented, or modified, response to the client system. The modified response is sent to the client system in real time or in substantially real time as the instrumentation is performed efficiently and quickly. The client system, having received the instrumented response, displays a graphical user interface that is modified to reflect which portions of the Web application have been tested and which have not. The visualization of the coverage data is implemented within the actual graphical user interface (GUI) of the Web application that is being tested. The GUI will change over time in accordance with the particular elements that are selected and executed.

In another aspect, the SUT can be configured to identify an HTTP parameter of a form submitted from the client system that is lacking a value. The SUT, being instrumented to track executed code and work in cooperation with the runtime analysis module, determines one or more portions of the Web application that were not executed in consequence of the missing value for the parameter. In that case, the SUT can send test coverage data to the proxy system indicating the unused parameter of the prior submitted form. The proxy system can receive the test coverage data and modify a response to the client system to add or include a new data entry element configured to receive a value for the unused parameter. In a further example, the proxy system prepopulates the new data entry element with a value specified by the test coverage data from the SUT prior to sending the modified response. The runtime analysis module, for example, can determine the particular value necessary for the parameter in order to execute one or more additional portions of unexecuted (or unvisited) program code of the Web application. That value can be provided to the client system by prepopulating the value in the added field as described.

Figure 4:
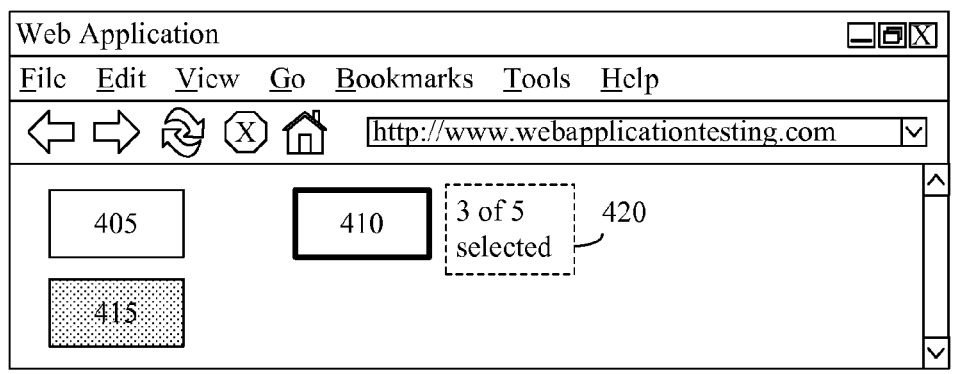
FIG. 4 is a block diagram illustrating an exemplary graphical user interface for a Web application undergoing testing.

FIG. 4 is a block diagram illustrating an exemplary GUI 400 for a Web application undergoing testing. FIG. 4 illustrates a response provided from the SUT to a client system. The response is a Web page that is rendered within a browser executing within the client system. Accordingly, GUI 400 includes a plurality of visual elements such as buttons 405, 410, and 415. Each of buttons 405, 410, and 415, when selected, submits an HTTP request to the SUT. GUI 400 is an example of an instrumented response (or page) from the Web application as performed by the proxy system.

As pictured, button 405 has not been modified by the proxy system in any way thereby indicating that button 405 has not been selected during the testing of the Web application. The proxy system has modified button 415 by adding shading which represents either a change in a visualization of the element or a disablement of the element altogether by the proxy system. In either case, the shading indicates that button 415 was previously selected and is thereby visually distinguished from button 405.

The proxy system has modified button 410 to indicate that button 410 has been selected at least one time previously. In addition, coverage data relating to button 410 has been received and added to the page by the proxy system as visual element 420. Visual element 420 indicates that selection of button 410 results in the retrieval of a further page from the Web application that includes five selectable links or visual elements. The coverage data indicates that of the five links that are displayed responsive to selecting button 410, three of the links have been visited, leaving two of the links untested. As shown, the visualization of button 410 distinguishes button 410 from button 405 and button 415. Button 410, for example, has been visited, but one or more links accessible through button 410 require testing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method, comprising:
   intercepting, within a proxy system, a request from a client system sent to a system under test;
   analyzing the request within the proxy system and sending the request to the system under test;
   intercepting, within the proxy system, a response from the system under test sent to the client system;
   instrumenting the response, using a processor of the proxy system, creating a modified response indicating test coverage according to the request; and
   sending the modified response to the client system.

2. The method of claim 1, wherein instrumenting comprises:
   changing a visualization parameter of an element of the response indicating a prior selection of the element.

3. The method of claim 1, wherein analyzing comprises:
   determining an element of a page from the system under test selected from the client system that initiates the request; and
   storing the element within a list of elements selected from the client system.

4. The method of claim 3, wherein instrumenting comprises:
   comparing elements of the response with the list of elements selected from the client system; and
   modifying an element of the response matching an element from the list.

5. The method of claim 1, wherein instrumenting comprises:
   detecting an element of the response associated with a first client side script; and
   associating a second client side script with the element that is different from the first client side script, wherein the second client side script is configured to send a notification to the proxy system responsive to selection of the element within the client system.

6. The method of claim 5, wherein the second client side script further invokes the first client side script.

7. The method of claim 1, further comprising:
   receiving test coverage data from the system under test; and
   modifying an element of the response according to the test coverage data.

8. The method of claim 1, further comprising:
   receiving test coverage data from the system under test; and
   adding at least one additional element to the modified response according to the test coverage data.

9. The method of claim 1, further comprising:
   receiving test coverage data from the system under test indicating an unused parameter of a form;
   wherein instrumenting the response comprises adding a new data entry element configured to receive a value for the unused parameter.

10. The method of claim 9, further comprising:
    within the proxy system, prepopulating the new data entry element with a value specified by the test coverage data from the system under test prior to sending the modified response.

* * * * *